United States Patent
Moilanen et al.

(10) Patent No.: US 12,101,837 B2
(45) Date of Patent: Sep. 24, 2024

(54) FAILURE RECOVERY FOR MULTI-UE DEVICE

(71) Applicant: Nokia Technologies Oy, Espoo (FI)

(72) Inventors: Jani Moilanen, Helsinki (FI); David Navrátil, Helsinki (FI); Ling Yu, Kauniainen (FI); Vinh Van Phan, Oulu (FI); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 358 days.

(21) Appl. No.: 17/427,193

(22) PCT Filed: Jan. 21, 2020

(86) PCT No.: PCT/FI2020/050033
§ 371 (c)(1),
(2) Date: Jul. 30, 2021

(87) PCT Pub. No.: WO2020/169875
PCT Pub. Date: Aug. 27, 2020

(65) Prior Publication Data
US 2022/0151005 A1 May 12, 2022

Related U.S. Application Data

(60) Provisional application No. 62/807,870, filed on Feb. 20, 2019.

(51) Int. Cl.
*H04W 76/19* (2018.01)
*H04W 76/15* (2018.01)
*H04W 88/06* (2009.01)

(52) U.S. Cl.
CPC ........... *H04W 76/19* (2018.02); *H04W 76/15* (2018.02); *H04W 88/06* (2013.01)

(58) Field of Classification Search
CPC ...... H04W 76/19; H04W 76/15; H04W 88/06
See application file for complete search history.

(56) References Cited

U.S. PATENT DOCUMENTS

| 2009/0198407 A1 | 8/2009 | Sakai et al. |
| 2016/0037405 A1* | 2/2016 | Choi ..................... H04W 48/20 455/444 |

(Continued)

FOREIGN PATENT DOCUMENTS

| WO | 2017/137075 A1 | 8/2017 |
| WO | 2018/207001 A1 | 11/2018 |

OTHER PUBLICATIONS

Extended European Search Report received for corresponding European Patent Application No. 20759336.9, dated Oct. 4, 2022, 8 pages.

(Continued)

*Primary Examiner* — Chi Ho A Lee
(74) *Attorney, Agent, or Firm* — Lippes Mathias LLP (57) ABSTRACT

Methods, apparatuses, and computer program products are disclosed for implementing recovery from a communication failure. A method includes receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; based upon the indication, the first user equipment transmitting to a network equipment a first signal to activate a secondary reliability group for the first user equipment; and receiving, by the first user equipment, a second signal to use the secondary reliability group, where the second signal is at least partially based upon the first signal transmitted from the first user equipment.

17 Claims, 9 Drawing Sheets

(56) References Cited

U.S. PATENT DOCUMENTS

| | | | | |
|---|---|---|---|---|
| 2018/0063880 | A1* | 3/2018 | Bhardwaj | H04W 76/19 |
| 2018/0270649 | A1* | 9/2018 | Tsai | H04W 8/183 |
| 2019/0208543 | A1* | 7/2019 | Dhanapal | H04W 72/541 |
| 2019/0335379 | A1* | 10/2019 | Joseph | H04W 28/06 |
| 2019/0373663 | A1* | 12/2019 | Yu | H04W 92/10 |
| 2019/0387561 | A1* | 12/2019 | Paladugu | H04W 8/24 |
| 2021/0051755 | A1* | 2/2021 | Bao | H04W 24/10 |
| 2021/0168889 | A1* | 6/2021 | Kimba Dit Adamou | H04W 76/18 |
| 2022/0086768 | A1* | 3/2022 | Yeo | H04W 52/242 |
| 2022/0248206 | A1* | 8/2022 | Gopal | H04L 5/14 |

OTHER PUBLICATIONS

"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.0.0, Dec. 2018, pp. 1-76.

International Search Report and Written Opinion received for corresponding Patent Cooperation Treaty Application No. PCT/FI2020/050033, dated Mar. 24, 2020, 13 pages.

"Updates to Solution #2 on Multiple UEs per Device for User Plane Redundancy", 3GPP TSG-SA WG2 Meeting #128, S2-187316, Agenda : 6.20, Ericsson, Jul. 2-6, 2018, 6 pages.

Office action received for corresponding Chinese Patent Application No. 202080015559.5, dated Dec. 26, 2023, 8 pages of office action and no page of translation available.

Notice of Allowance received for corresponding European Patent Application No. 20759336.9, dated Mar. 13, 2024, 8 pages.

* cited by examiner

FAILURE RECOVERY FOR MULTI-UE DEVICE

RELATED APPLICATION

This application was originally filed as PCT Application No. PCT/FI2020/050033 on Jan. 21, 2020, which claims priority from U.S. Provisional Application No. 62/807,870, filed on Feb. 20, 2019, each of which is incorporated herein by reference in its entirety.

BACKGROUND

Technical Field

The example and non-limiting embodiments relate generally to communications and, more particularly, to recovery from a communications failure.

Brief Description of Prior Developments

Enhancement of Ultra-Reliability Low-Latency Communication (URLLC) support has been studied in Service and System Aspects 2 (SA2) of 3GPP. One of the issues addressed by the study is provisioning of redundancy user plane transmission for improving system reliability.

SUMMARY

The following summary is merely intended to be an example. The summary is not intended to limit the scope of the claims.

An example method includes receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; based upon the indication, the first user equipment transmitting to a network equipment a first signal to activate a secondary reliability group for the first user equipment; and receiving, by the first user equipment, a second signal to use the secondary reliability group, where the second signal is at least partially based upon the first signal transmitted from the first user equipment.

An example apparatus includes at least one processor; and at least one non-transitory memory including computer program code, the at least one memory and the computer program code configured to, with the at least one processor, cause the apparatus to: receive, by a first user equipment of the apparatus, an indication that a second user equipment of the apparatus has experienced a failure, where the first user equipment and the second user equipment are part of a same apparatus, and where the first user equipment is configured with a first primary reliability group and where the second user equipment is configured with a second primary reliability group; based upon the indication, transmit to a network equipment a first signal to activate a secondary reliability group for the first user equipment; and receive, by the first user equipment, a second signal to use the secondary reliability group, where the second signal is at least partially based upon the first signal transmitted from the first user equipment.

A example non-transitory program storage device readable by a machine, tangibly embodying a program of instructions executable by the machine for performing operations is provided, the operations comprising: receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; based upon the indication, the first user equipment transmitting to a network equipment a first signal to activate a secondary reliability group for the first user equipment; and receiving, by the first user equipment, a second signal to use the secondary reliability group, where the second signal is at least partially based upon the first signal transmitted from the first user equipment.

An example method includes detecting, by a first network equipment, that a first user equipment has experienced a failure, and where the first user equipment is configured to belong to a primary reliability group which comprises the first network equipment; and transmitting an indication, by the first network equipment, to a second network equipment regarding the failure detected by the first network equipment, where the indication includes information for the second network equipment to inform the second user equipment to start use of a secondary reliability group.

An example apparatus includes at least one processor; and at least one non-transitory memory including computer program code, the at least one memory and the computer program code configured to, with the at least one processor, cause the apparatus to: detect, by a first network equipment of the apparatus, that a first user equipment has experienced a failure, and where the first user equipment is configured to belong to a primary reliability group which comprises the first network equipment; and transmit an indication, by the first network equipment, to a second network equipment regarding the failure detected by the first network equipment, where the indication includes information for the second network equipment to inform the second user equipment to start use of a secondary reliability group.

An example non-transitory program storage device readable by a machine, tangibly embodying a program of instructions executable by the machine for performing operations is provided, the operations comprising: detecting, by a first network equipment, that a first user equipment has experienced a failure, where the first user equipment is configured to belong to a primary reliability group which comprises the first network equipment; and transmitting an indication, by the first network equipment, to a second network equipment regarding the failure detected by the first network equipment, where the indication includes information for the second network equipment to inform the second user equipment to start use of a secondary reliability group.

An example method includes receiving an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

An example apparatus includes at least one processor; and at least one non-transitory memory including computer program code, the at least one memory and the computer program code configured to, with the at least one processor, cause the apparatus to: allow receiving of an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

An example non-transitory program storage device readable by a machine, tangibly embodying a program of instructions executable by the machine for performing operations is provided, the operations comprising: allow receiving of an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
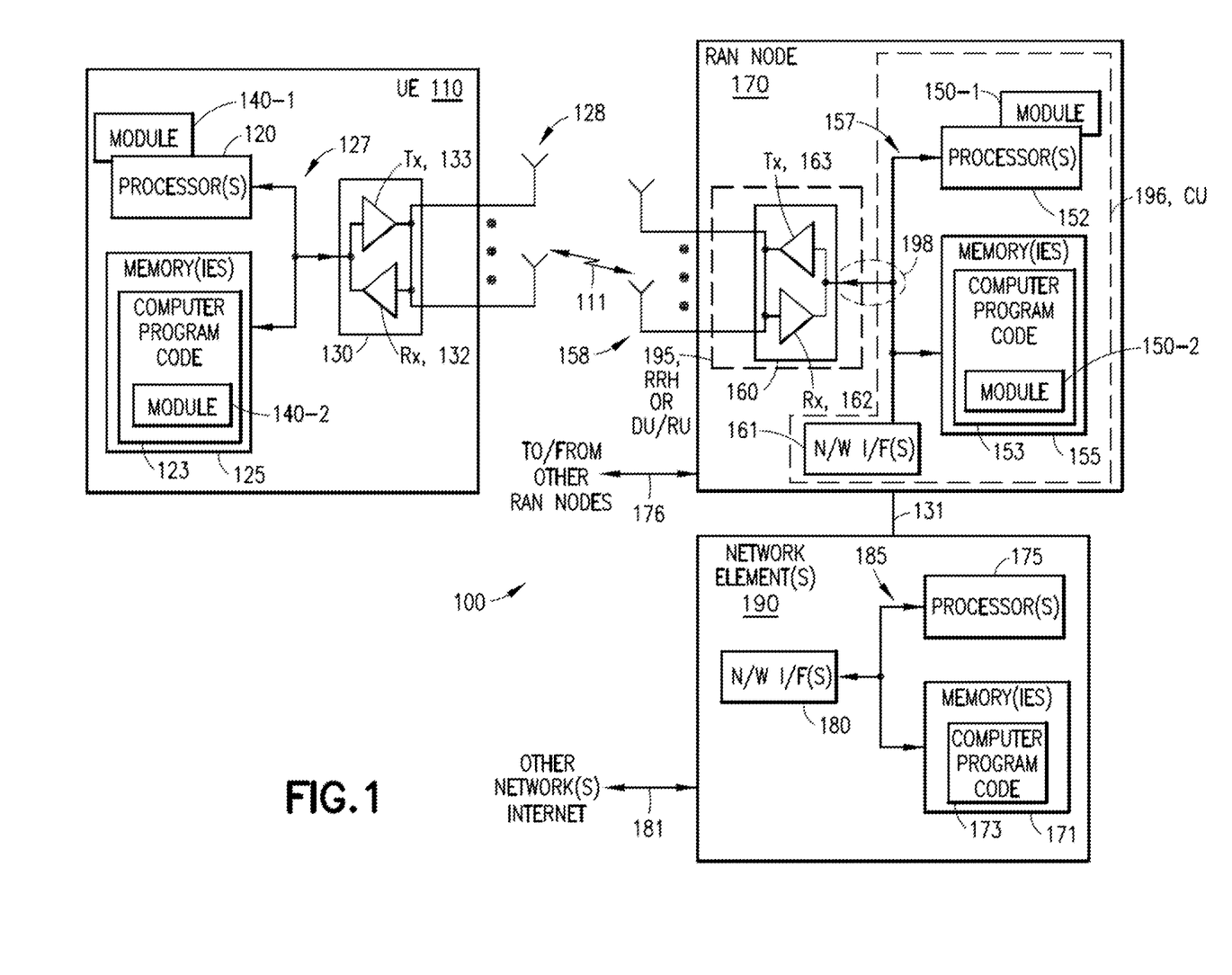
FIG. 1 is a block diagram of one possible and non-limiting example of a system in which example embodiments may be practiced.

The following abbreviations that may be found in the specification and/or the drawing figures are defined as follows:
3GPP third generation partnership project
3GPP TS 3GPP Technical Specification
5G fifth generation
5GC 5G core network
AMF Access and Mobility management Function
CN Core Network
CP Control Plane
MgNB Master gNB
SgNB Secondary gNB
PDCP Packet Data Convergence Protocol
PDU Packed Data Unit
RAN Radio Access Network
RG Reliability Group
SMF Session Management Function
UP User Plane
UPF User Plane Function
URLLC Ultra-Reliable Low-Latency Communication Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless, typically a mobile device, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
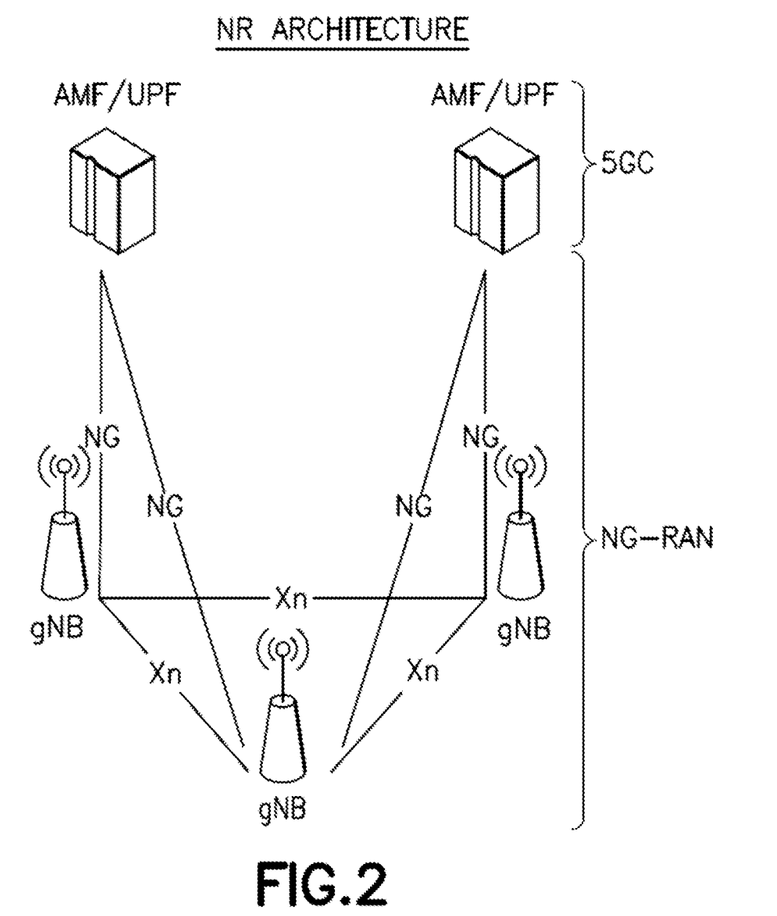
FIG. 2 shows an example illustration of New Radio (NR) architecture having the 5G core (5GC) and the NG-RAN.
Figure 3:
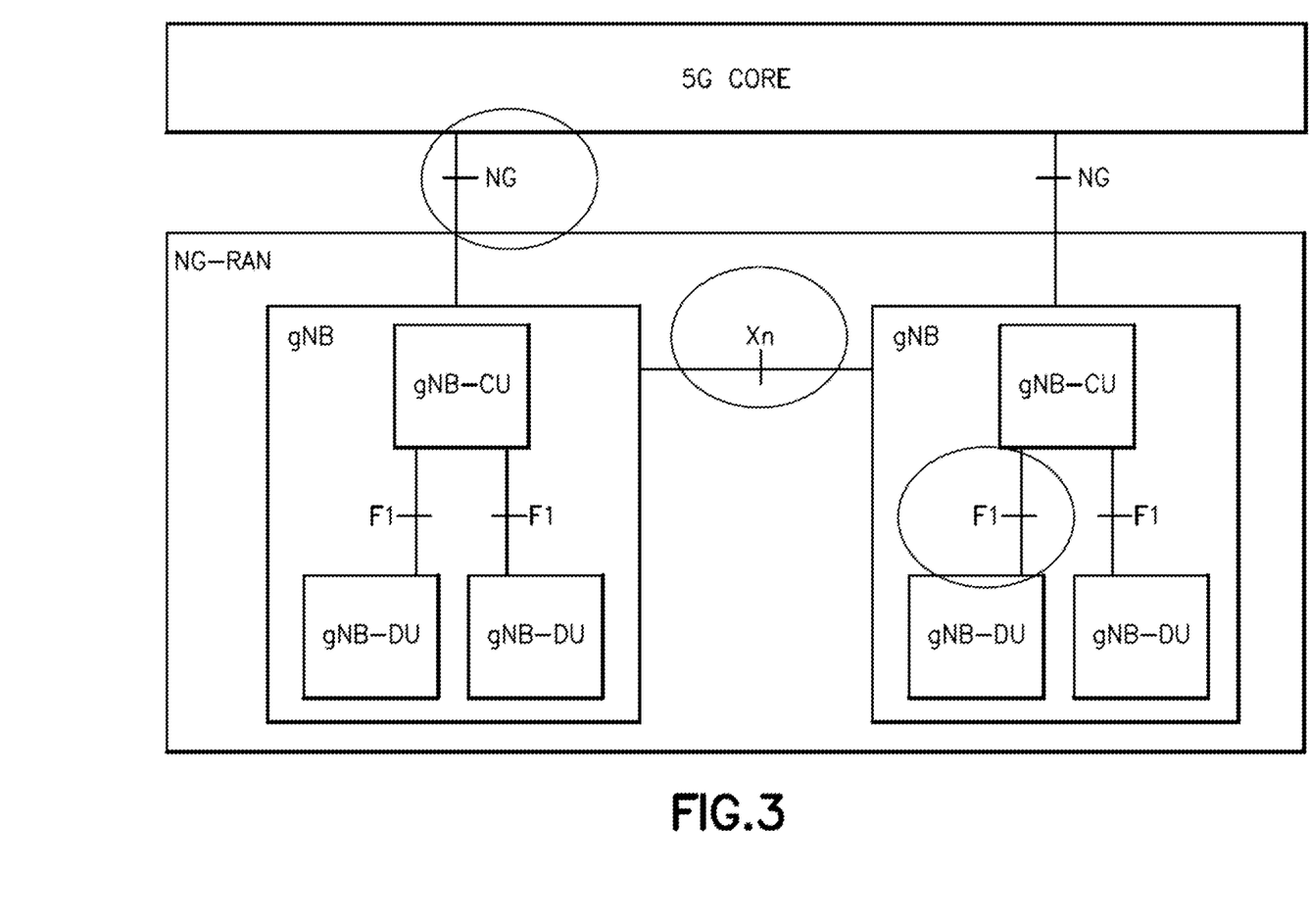
FIG. 3 shows an example block diagram of New Radio (NR) architecture having the 5G core (5GC) and the NG-RAN.

FIGS. 2-3 shows an example of New Radio (NR) architecture having the 5G core (5GC) and the NG-RAN. The base stations gNB are coupled to the 5GC by the interface to Core NGs, and the gNBs are coupled to each other by the inter-base stations interface Xn.

Having thus introduced one suitable but non-limiting technical context for the practice of the example embodiments, example embodiments will now be described with greater specificity.

Figure 4:
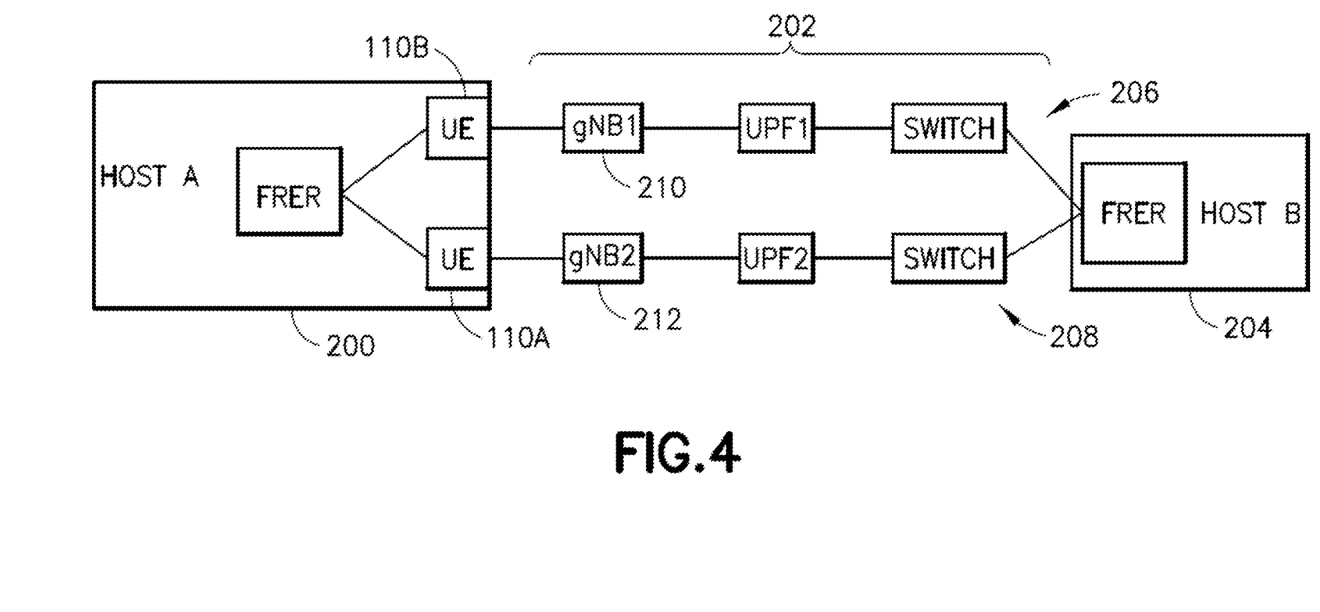
FIG. 4 is an example implementation of user plane redundancy, showing an example path comprises two redundant paths between hosts.
Figure 5:
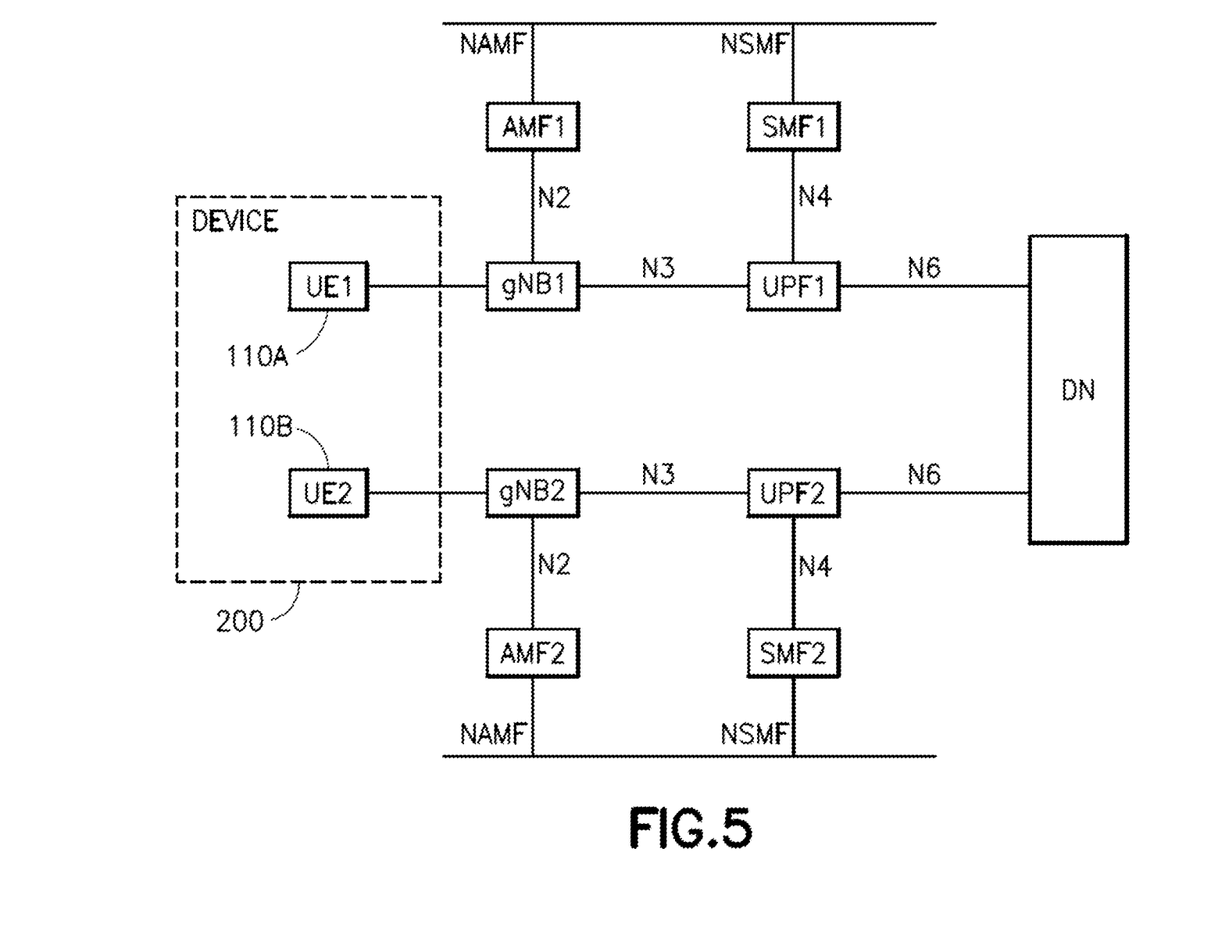
FIG. 5 is a block diagram of an example implementation of user plane redundancy.

Referring also to FIGS. 4 and 5, a solution regarding user plane redundancy, specifically in regard to enhancement of Ultra-Reliable Low-Latency Communication (URLLC) support in a 5G Core network (5GC) will be described. However, it should be noted that features as described herein are not limited to only Ultra-Reliable Low-Latency Communication (URLLC) support in a 5G Core network (5GC). These figures show a high-level architecture and the mapping to 5GC architecture, respectively. At least two UEs 110A, 110B may be provided on a single device 200. The two UEs 110A, 110B may be configured to operate similarly to independent and separate UEs. This provides full redundancy over an entire end-to-end path 202 between Host A 200 and Host B 204; allowing the network to cope with failures at any network node, including a hardware failure of one of the UEs. FIG. 4 shows that the path 202 comprises two redundant paths 206, 208 in this example. More than dual redundancy could be provided with more than two paths. Thus, more than two redundant paths may be provided, and may not be total separate as shown. This solution sets up two disjointed redundant user plane paths in the 5G system; either from one UE or two UEs for support of high reliability. However, no specific features have been supported in the 3GPP standards for "a multi-UE device". The interfaces directly between two or more UEs in a same device may introduce new features to implement in the UEs.

Figure 9:
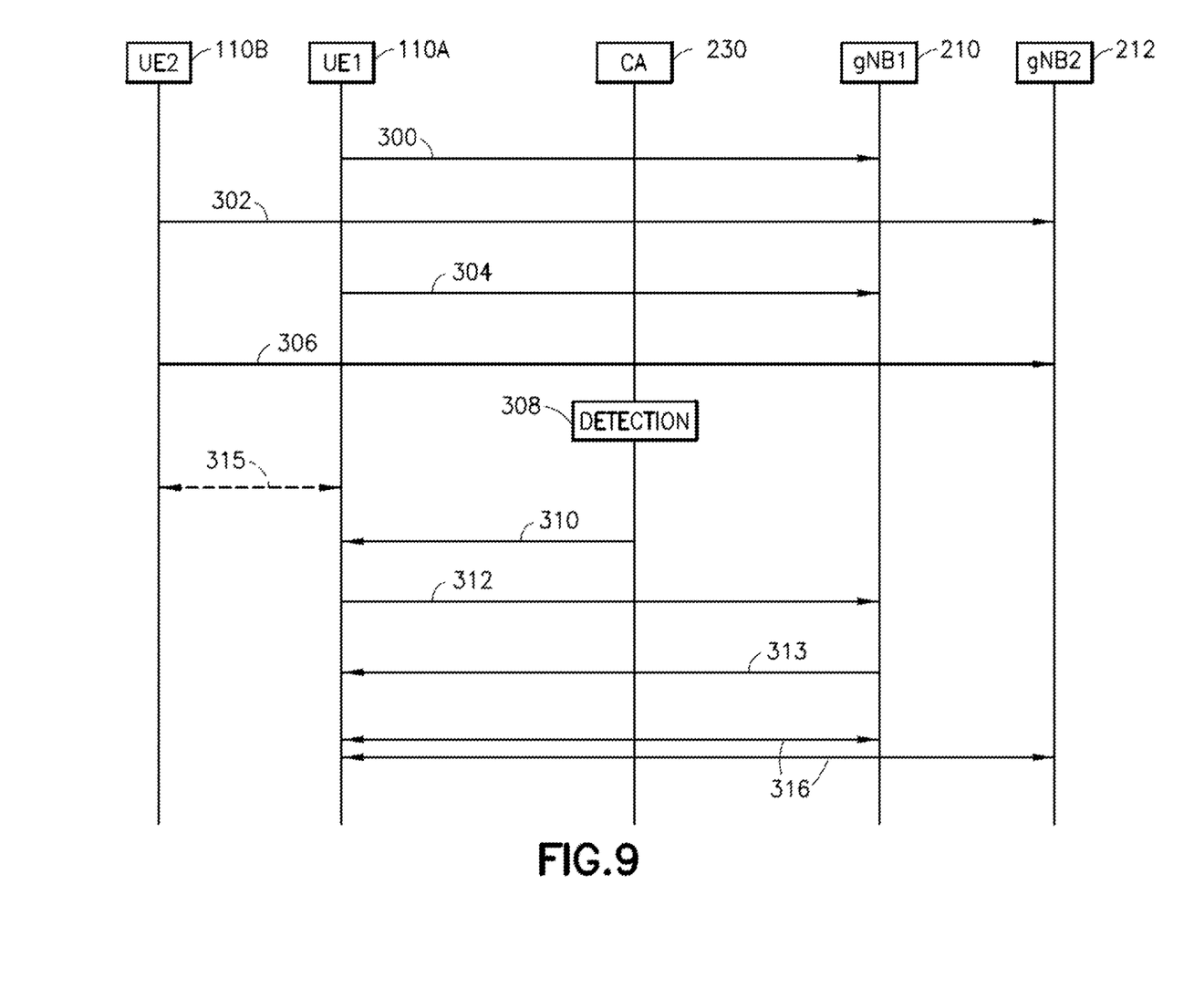
FIG. 9 illustrates an example method to implement failure recovery for a multi-UE device, where failure is detected by the multi-UE device.

In order to ensure that redundant paths can be created and maintained for the two UEs 110A, 110B in this example, each UE may be configured to belong to a different primary "reliability group" (RG). A reliability group may represent a distinct set of network resources that provide redundancy in the network system. For example, UE1 110A may be configured to belong to reliability group 1 (RG1) as its primary reliability group, and UE2 110B may be configured to belong to reliability group 2 (RG2) as its primary reliability group. As illustrated by 300 and 302 in FIG. 9, both UEs 110A, 110B may be configured to report or identify their own "primary" reliability group to the network. The network could be correspondingly configured to use infrastructure resources in "path A" such as 206 for example for all UEs of reliability group 1 RG1, and to use infrastructure resources in "path B" such as 208 for example for all UEs of reliability group 2 RG2. This may be done without the network knowing whether the UEs 110A, 110B belong to a same device or to different devices.

However, without more, this configuration creates potential problems. For example, in the event there is a failure in a first one of the UEs 110A, the remaining UE 110B is not able to utilize resources of the path 206 of the first UE 110A. For example, Packet Data Convergence Protocol (PDCP) level duplication could not be used between gNB1 210 from "path A" 206 and gNB2 212 from "path B" 208. As a result of the failure of the first UE 110A, the device 200 would have to rely on only a single link to the device 204 via the path 208. Reliance on only the single link would compromise the reliability of communications between the devices 200, 204 until the device 200 is fixed.

Features as described herein propose a fast, autonomous recovery in the event that one of the UEs in the device 200 fails. As noted above, each UE may be configured to belong to a different primary reliability group. In addition, with features as described herein, each UE may also be configured to have a different secondary reliability group. In this example, UE1 110A may be configured to have reliability group 2 RG2 as its secondary reliability group, and UE2 110B may be configured to have reliability group 1 RG1 as its secondary reliability group. As indicated by 304 and 306 in FIG. 9, the UEs 110A, 110B may be configured to report or identify their respective "secondary" reliability group to the network.

Figure 6:
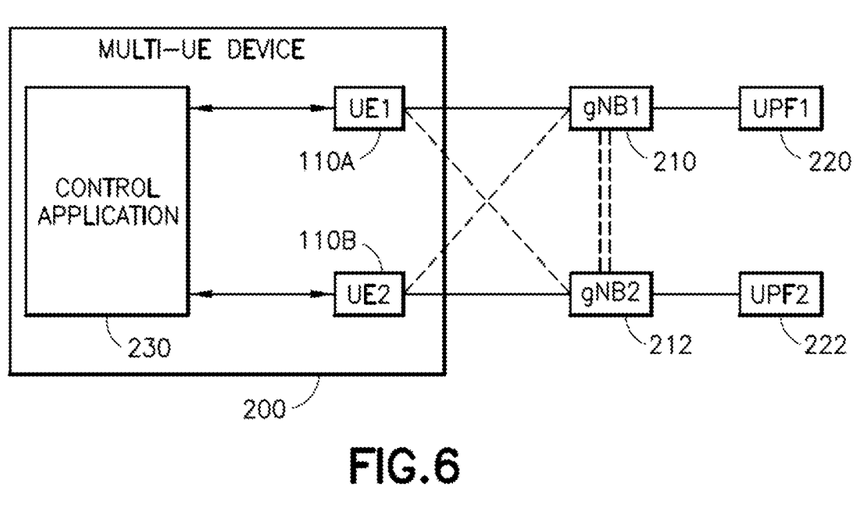
FIG. 6 shows an example configuration of a device with multiple UEs.
Figure 7:
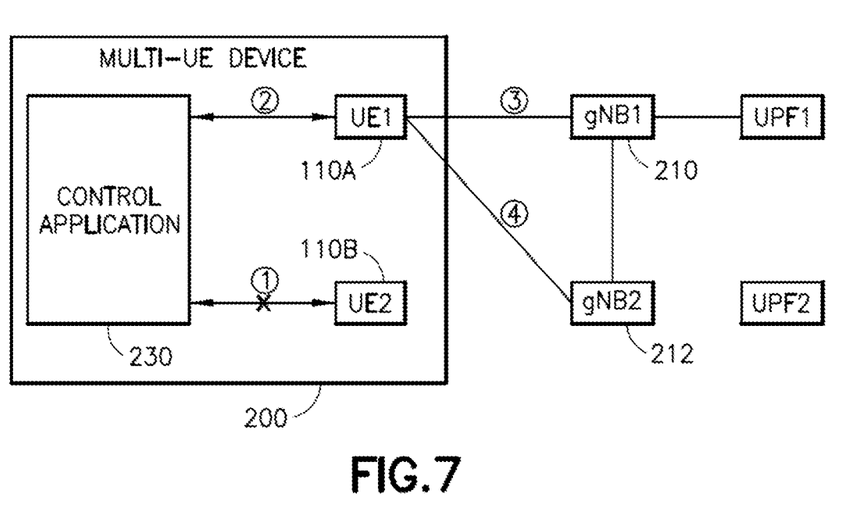
FIG. 7 is a diagram illustrating an example method of establishing a fast-recovery.
Figure 8:
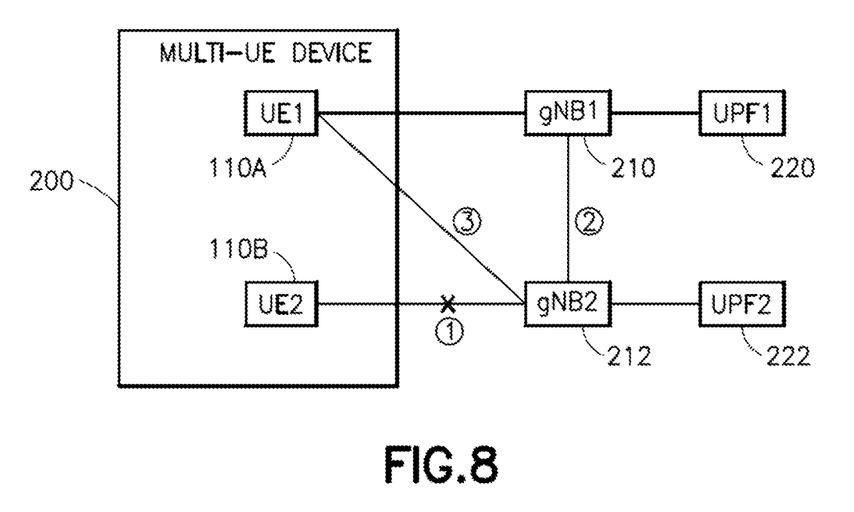
FIG. 8 is an example illustrating where a node or base station gNB detects a UE failure.

The radio access network (RAN) may pre-configure multi-connectivity for a single UE to be able to use resources from more than one reliability group. For example, the RAN may pre-configure dual-connectivity for a UE to use resources from both the primary reliability group RG1 and the secondary reliability group RG2, provided by gNB1 and gNB2, as shown in FIGS. 6-8 for example. However, by default, traffic may be scheduled via only the UE's primary reliability group until a UE failure occurs. Once a UE failure is detected, there may be a switch from using only the primary reliability group to using dual-connectivity of both the primary reliability group and the secondary reliability group. If a UE failure occurs, such as UE1 110A fails for example, another UE in the same device 200, such as 110B for example, is allowed to be scheduled via resources of both its primary reliability group RG2 and also via its secondary reliability group RG1 using the pre-configured dual-connectivity provided by gNB1 and gNB2, as shown in FIGS. 6-8 for example. In other words, when a first UE in a device fails, the second UE in the device can be switched from using single connectivity to using dual connectivity (DC).

Failure Detection

UE failure may be detected using in-device signaling in the device 200 for example. In one example embodiment, an application or a control entity in the device 200 may detect that UE1 110A does not respond, indicating a failure, and the device 200 may send a trigger to UE2 110B to reconfigure its reliability group to activate use of its secondary reliability group. However, this does not stop the UE2 110B from continuing using its primary reliability group. After the failure detection trigger has reached UE2, UE2 may send a secondary reliability group activation message to the network. The message may implicitly or explicitly indicate the cause due to a UE failure with or without any further UE contexts of the failed UE1. The network can then allow UE2 to use the pre-configured dual connectivity (DC) provided by gNB1 and gNB2 for continuing at least path 208. In an alternate example embodiment, the node or base station gNB1 may detect a UE failure, such as an active UE1 stops responding for example, for an UE which has a resource group limitation such as UE1. It is noted that the node or base station gNB1 knows of both the primary reliability group RG1 and the secondary reliability group RG2 of UE1; as UE1 indicated this information to the node or base station gNB1 in an earlier phase. It is further noted that UE1 may or may not indicate to the node or base station gNB1 in the earlier phase any further UE contexts of the other in-device UE2; depending on specified levels of in-device signaling and awareness between the in-device UEs. The node or base station gNB1 may then inform its relevant neighbor gNB(s) to at least remove reliability group restrictions regarding the primary reliability group RG1 of the failed UE1 for all other relevant UEs which may have pre-configured dual-connectivity provided by the node or base station gNB1 as for the secondary reliability group. The message from the node or base station gNB1 to its relevant neighbor gNB(s) may indicate the primary reliability group RG1 and the secondary reliability group RG2 of the failed UE1, with or without any further UE contexts of the failed UE1. It is noted that the node or base station gNB1 may or may not have knowledge of the other in-device UE2 of the failed UE1; in accordance to the indication from UE1 in earlier phase as noted above. In case the node or base station gNB1 has sufficient knowledge of the other in-device UE2 of the failed UE1, as indicated by the failed UE1 in earlier phase, the node or base station gNB1 may be able to identify the other in-device UE2 and/or the serving node or base station gNB2 of the other in-device UE2 as for the primary reliability group RG2 of other in-device UE2. Then, as soon as the node or base station gNB1 detected a UE failure of UE1, the node or base station gNB1 may inform gNB2 to activate the pre-configured dual connectivity for the other in-device UE2 of the device 200. It is further noted that the indicated UE failure detection from the UE side can be coupled with the indicated UE failure detection from neighboring gNB in terms of timing as well as contents of these indications in order to identify impacted UE(s) as well as impacted gNB(s) for activating the pre-configured dual-connectivity in a more reassuring way.

Configuration of a Device with Multiple UEs

Referring also to FIG. 6, in the case that two (or more) UEs 110A, 110B are integrated to a same device 200, the UEs may be configured to use a respective specific primary reliability group. For example, this may be accomplished via a manual configuration. In one type of example embodiment, this manual configuration may be in a device integration phase. For example, reliability group 1 RG1 (such as comprising base station gNB1 210 and User Plan Function 1 UPF1 220 for example) may be used for UE1, reliability group 2 RG2 (such as comprising gNB2 212 and UPF2 222 for example) may be used for UE2, and so forth. Such configuration may be introduced via a proprietary or standardized configuration interface for example. The manual configuration may be extended to allow for an in-device UE to know about existence of other in-device UE as well as the assigned primary and secondary reliability group of other in-device UE which may be indicated by in-device UE to the serving network of the primary reliability group.

An alternative to manual configuration may comprise reliability group selection implemented using some type of automated selection by means of a processor and memory with computer code in the device 200 for example. For example, when a first UE becomes active, it may listen to an uplink channel of one of the frequencies, such as gNB1 operating on frequency f1. If the first UE does not detect extremely strong uplink (UL) signals on f1, the first UE may then be free to select the reliability group as its primary reliability group and inform this selection to gNB1. Similarly, when second UE becomes active, it may also listen to an uplink channel of some frequency. In case the second UE detects an extremely strong signal strength, it can assume that there is another UE already operating in that reliability group in the same device, and may then try to connect to a gNB on another frequency, such as gNB2 on f2 for example, and informs gNB2 that it is the primary reliability group for the second UE. The UE2 may also indicate to the gNB2 about the detection or assumption of another UE on f1, as determined by the UE2. In this type of method, the system would be configured to allow UE1 to listen and take action, or at least have priority of selection over UE2.

Configuration of a Network to Support a Multi-UE Device

After reliability group configuration, the UEs 110A, 110B may establish connection to their primary reliability group. The network may also pre-configure multi-connectivity for the UEs; such as dual-connectivity if a device has two UEs. However, due to the reliability group limitations, the network may be configured to only activate the link of the primary reliability group for each respective UE, as illustrated in FIG. 6. In this figure, the solid lines denote active links, and the dashed lines denote links that are configured, but inactive. The Packet Data Unit (PDU) session for UE1 (from reliability group 1 RG1) may be configured to use gNB1 as a Master gNB (MgNB) and gNB2 as a Secondary gNB (SgNB). However, without a UE failure detection, data with UE1 may be scheduled only via the primary reliability group and gNB1 210. Similarly, the Packet Data Unit (PDU) session for UE2 (from reliability group 2 RG2) may be configured to use gNB2 as its MgNB and gNB1 as its SgNB but, without a UE failure detection, data with UE2 is scheduled only via gNB2.

After the PDU session configuration, both UEs may operate independently without any direct interaction. However, within the device 200 a control application 230 may continuously monitor whether the UEs 110A, 110B are operational, such as via a periodic in-device control signaling for example. The control application 230 may comprises computer software code stored on a memory configured to be used with a processor of the device 200.

Fast Recovery in Case of UE Failure

Referring also to FIG. 7, one example method of establishing a fast-recovery will be described. In this example, the control application or control entity 230 in the device 200 may detect, as indicated by 308 in FIG. 9, that a UE does not respond, indicating a failure, and the device 200 may send a trigger 310 to the other UE to reconfigure its reliability group to activate use of its secondary reliability group. This is illustrated in FIG. 7 by Step (1) where the Control Application (CA) detects that UE2 110B has a failure; for example that UE2 stops transmitting control signaling. At Step (2) the Control Application (CA) 230 may reconfigure UE1 110A to activate its secondary reliability group. At Step (3) in FIGS. 7 and 312 in FIG. 9, UE1 110A may indicate to the network that UE1 110A wishes to active its secondary reliability group. In a case in which the dual connectivity (DC) is already pre-configured, a one-bit indication to the network may be used to indicate dual connectivity (DC) activation for example. In a case in which dual connectivity (DC) is not yet configured, this might require the network to add dual connectivity to the existing PDU Session of UE1 110A. So, the UE1 may request a PDU session modification procedure in order to support dual connectivity with gNB1/gNB2 within a same PDU Session. At Step (4) the gNB1 may activate PDCP duplication as indicated by 313 in FIG. 9 allowing the UE1 110A to still benefit from reliable wireless connectivity using two base stations or nodes. Dual connectivity of UE1 to gNB1 and gNB2 is established as indicated by 316 in FIG. 9. In an alternate example embodiment, or additional feature, as illustrated by 315 in FIG. 9 the UE1 110A may detect via direct signaling between UE1 and UE2 that the UE2 110B does not respond; indicating a failure of the UE2 110B. After the failure detection UE1 may send a secondary reliability group activation message 312 to the network.

Figure 10:
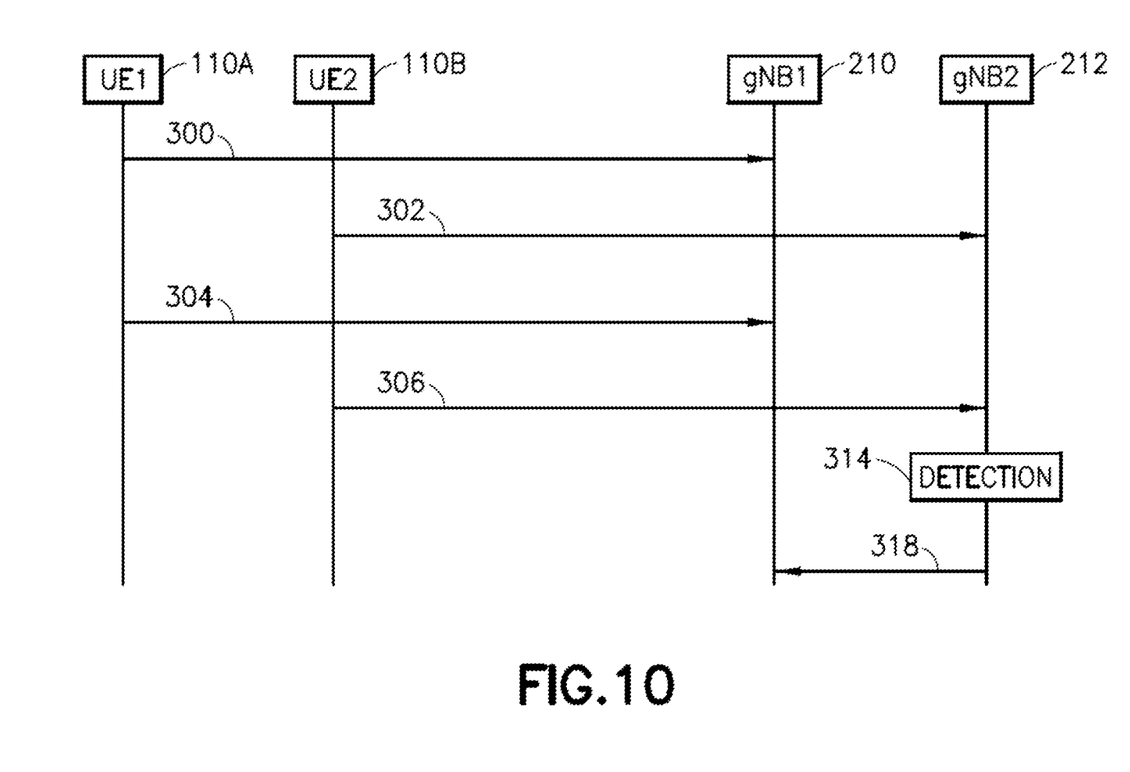
FIG. 10 illustrates an example method to implement failure recovery for a multi-UE device, where failure is detected by a base station.

Referring also to FIG. 8, this example illustrates where a node or base station gNB detects a UE failure. At Step (1) in FIG. 8, and as indicated by 314 in FIG. 10, gNB2 212 may detect that UE2 110B has a failure, such as UE2 110B stops transmitting User Plan (UP) signaling and/or Control Plan (CP) signaling, or Radio Link Failure (RLF) is detected for example. As indicated by Step (2) in FIGS. 8 and 318 in FIG. 10, gNB2 212 may inform gNB1 210 that it has detected failure for reliability group 2 RG2. At Step (3) gNB1 210 may activate PDCP duplication for active UEs which have gNB2 configured as a secondary reliability group; allowing UE1 110A to still benefit from reliable wireless connectivity with use of both gNB1 and gNB2. In some further embodiments, gNB1 210 may selectively activate dual connectivity (DC); for only a subset of active UEs. For example, gNB1 may activate dual connectivity (DC) for only UEs which have poor link quality compared to the Quality of Service (QoS) requirements of the PDU session and, thus, benefit most from dual connectivity. In addition, the network may utilize a cell level criteria, such as cell load for example, to decide whether to use selective activation. For example, in case of a low URLLC load, gNB1 could activate dual connectivity to all UEs, while in case of a high URLLC load it may selectively activate dual connectivity only for those UEs that benefit most from increased reliability.

3GPP technical report TR 23.725 describes a number of solutions regarding user plane redundancy, specifically in regard to enhancement of Ultra-Reliable Low-Latency Communication (URLLC) support in a 5G Core network (5GC)(Release 16). Solution #2 in TR 23.725 proposes to deploy at least two UEs on a device and operate the UEs similar to independent UEs. However, features as described herein may be used to provide a failure recovery for a device having multiple UEs and user plane redundancy not previously envisioned, specifically applicable in regard to enhancement of Ultra-Reliable Low-Latency Communication (URLLC) support in a 5G Core network (5GC).

With features as described herein, end-to-end redundant network paths, with multiple UEs per device, may be provided to support ultra-high reliability over wireless systems. This may be used to provide an efficient co-existence with lower layer multi-connectivity (such as PDCP level dual-connectivity for example). When packets are replicated using End-to-End (E2E) redundancy, lower layers multi-connectivity may avoid additional (unnecessary) redundancy over the same links. Fast recovery in case of a UE failure may be provided with a fast fallback from E2E redundancy (with multiple UEs per device) to lower layer multi-connectivity (with single UE per device).

Failure Signaling for Maintenance or Repair

In further embodiments, the Control Application (CA) may be configured to notify a monitoring application that the Control Application (CA) has detected a UE failure, indicating that the UE experiencing the failure should be fixed or replaced during a next maintenance.

Resumption After Maintenance or Repair

As soon as a previously failed UE is again operational or has been operationally replaced, an application and/or controller may be configured to detect this, and trigger a secondary reliability group de-activation message towards the network. For example, if a UE which has experienced a failure has been replaced during maintenance or repair by a new UE, this replacement may be detected and the compensating UE may be switch from dual connectivity back to single connectivity.

In accordance with one example method, a method may be provided comprising: receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; based upon the indication, the first user equipment transmitting to a network equipment a first signal to activate a secondary reliability group for the first user equipment; and receiving, by the first user equipment, a second signal to use the secondary reliability group, where the second signal is at least partially based upon the first signal transmitted from the first user equipment.

The device may comprise a housing which houses the first user equipment and the second user equipment. The device may be a mobile device, and where the first user equipment and the second user equipment are connected to move together when the device is moved. The indication may be an indication from a control entity of the device. The control entity may comprise a control application configured to detect when the second user equipment has a failure, and cause the first user equipment to be reconfigured to activate use of the secondary reliability group. The control application may be configured to notify a monitoring application that the control application has detected the failure indicating that the second user equipment needs to be repaired or replaced. The indication may be based upon direct signaling between the first user equipment and the second user equipment. The first signal may comprise a one-bit indication to the network equipment to indicate dual connectivity (DC) activation. The first signal may comprise a request by the first user equipment for a packet data unit session modification procedure in order to support dual connectivity. The method may further comprise, based upon receipt of the second signal, the first user equipment switching from a single connectivity with a single base station to a multi-connectivity with at least two base stations. The method may further comprise detecting repair or replacement of the second user equipment and subsequently transmitting an indication to deactivate use of the secondary reliability group by the first user equipment. The secondary reliability group may be the second primary reliability group of the second user equipment.

An example embodiment may be provided in an apparatus comprising at least one processor; and at least one non-transitory memory including computer program code, the at least one memory and the computer program code configured to, with the at least one processor, cause the apparatus to: receive, by a first user equipment of the apparatus, an indication that a second user equipment of the apparatus has experienced a failure, where the first user equipment and the second user equipment are part of a same apparatus, and where the first user equipment is configured with a first primary reliability group and where the second user equipment is configured with a second primary reliability group; based upon the indication, transmit to a network equipment a first signal to activate a secondary reliability group for the first user equipment; and receive, by the first user equipment, a second signal to use the secondary reliability group, where the second signal is at least partially based upon the first signal transmitted from the first user equipment.

The apparatus may comprise a housing which houses the first user equipment and the second user equipment. The apparatus may be a mobile device, and where the first user equipment and the second user equipment are connected to move together when the mobile device is moved. The indication may be an indication from a control entity of the apparatus. The control entity may comprise a control application configured to detect when the second user equipment has a failure, and cause the first user equipment to be reconfigured to activate use of the secondary reliability group. The control application may be configured to notify a monitoring application that the control application has detected the failure indicating that the second user equipment needs to be repaired or replaced. The indication may be based upon direct signaling between the first user equipment and the second user equipment. The first signal may comprise a one-bit indication to the network equipment to indicate dual connectivity (DC) activation. The first signal may comprise a request by the first user equipment for a packet data unit session modification procedure in order to support dual connectivity. The apparatus may be further configured to, based upon receipt of the second signal, the first user equipment switching from a single connectivity with a single base station to a multi-connectivity with at least two base stations. The apparatus may be further configured to detect repair or replacement of the second user equipment and subsequently transmit an indication to deactivate use of the secondary reliability group by the first user equipment. The secondary reliability group may be the second primary reliability group of the second user equipment.

An example embodiment may be provided in a non-transitory program storage device readable by a machine, tangibly embodying a program of instructions executable by the machine for performing operations, the operations comprising: receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; based upon the indication, the first user equipment transmitting to a network equipment a first signal to activate a secondary reliability group for the first user equipment; and receiving, by the first user equipment, a second signal to use the secondary reliability group, where the second signal is at least partially based upon the first signal transmitted from the first user equipment.

The non-transitory program storage device may be further configured. For example, the device may comprise a housing which houses the first user equipment and the second user equipment. The device may be a mobile device, wherein the first user equipment and the second user equipment are connected to move together when the device is moved. The indication may be an indication from a control entity of the device. The control entity may comprise a control application configured to detect when the second user equipment has a failure, and cause the first user equipment to be reconfigured to activate use of the secondary reliability group. The control application is configured to notify a monitoring application that the control application has detected the failure indicating that the second user equipment needs to be repaired or replaced. The indication may be based upon direct signaling between the first user equipment and the second user equipment. The first signal may comprise a one-bit indication to the network equipment to indicate dual connectivity activation. The first signal may comprise a request by the first user equipment for a packet data unit session modification procedure in order to support dual connectivity. The operations of the non-transitory program storage device may further comprise based upon receipt of the second signal, the first user equipment switching from a single connectivity with a single base station to a multi-connectivity with at least two base stations. The operations of the non-transitory program storage device may further comprise detecting repair or replacement of the second user equipment and subsequently transmitting an indication to deactivate use of the secondary reliability group by the first user equipment. The secondary reliability group may be the second primary reliability group of the second user equipment.

An example method may be provide in a method comprising: detecting, by a first network equipment, that a first user equipment has experienced a failure, and where the first user equipment is configured to belong to a primary reliability group which comprises the first network equipment; and transmitting an indication, by the first network equipment, to a second network equipment regarding the failure detected by the first network equipment, where the indication includes information for the second network equipment to inform the second user equipment to start use of a secondary reliability group.

The first user equipment and a second user equipment may be part of a same device, and where the device comprises a housing which houses the first user equipment and the second user equipment. The device may be a mobile device, and where the first user equipment and the second user equipment are connected to move together when the device is moved. The detecting may be based upon at least one of: the first network equipment detecting that the first user equipment has stopped transmitting User Plan (UP) signaling; the first network equipment detecting that the first user equipment has stopped transmitting Control Plan (CP) signaling; or the first network equipment detecting a Radio Link Failure (RLF) towards the first user equipment. The information, transmitted by the first network equipment to the second network equipment, may be configured to cause the second network equipment to activate dual connectivity for the second user equipment with at least the first network equipment and the second network equipment, where the first network equipment is configured as part of a secondary reliability group of the second user equipment.

An example embodiment may be provided in an apparatus comprising: at least one processor; and at least one non-transitory memory including computer program code, the at least one memory and the computer program code configured to, with the at least one processor, cause the apparatus to: detect, by a first network equipment of the apparatus, that a first user equipment has experienced a failure, and where the first user equipment is configured to belong to a primary reliability group which comprises the first network equipment; and transmit an indication, by the first network equipment, to a second network equipment regarding the failure detected by the first network equipment, where the indication includes information for the second network equipment to inform the second user equipment to start use of a secondary reliability group.

An example embodiment may be provided in a non-transitory program storage device readable by a machine, tangibly embodying a program of instructions executable by the machine for performing operations, the operations comprising: detecting, by a first network equipment, that a first user equipment has experienced a failure, where the first user equipment is configured to belong to a primary reliability group which comprises the first network equipment; and transmitting an indication, by the first network equipment, to a second network equipment regarding the failure detected by the first network equipment, where the indication includes information for the second network equipment to inform the second user equipment to start use of a secondary reliability group.

An example method may be provided in a method comprising: receiving an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

The indication may comprise a signal from the first user equipment to activate the secondary reliability group for the first user equipment. The indication may comprise an indication from the second network equipment indicating that the second network equipment has detected that the second user equipment has experienced a failure.

The first network equipment may be configured to selectively activate dual connectivity of the first user equipment for a subset of active user equipments. The selective activation of the dual connectivity of the first user equipment may be indicated when the first user equipment has a poor link quality compared to a Quality of Service requirements of a packed data unit session. The selective activation of the dual connectivity of the first user equipment may be indicated based upon a cell level criteria to decide whether to use the selective activation.

An example embodiment may be provided in an apparatus comprising: at least one processor; and at least one non-transitory memory including computer program code, the at least one memory and the computer program code configured to, with the at least one processor, cause the apparatus to: allow receiving of an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

An example embodiment may be provided in a non-transitory program storage device readable by a machine, tangibly embodying a program of instructions executable by the machine for performing operations, the operations comprising: allow receiving of an indication, by a first network equipment, where the indication indicates that a second user equipment has experienced a failure; based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

An example embodiment may be provided in an apparatus comprising means for receiving, by a first user equipment, an indication that a second user equipment has experienced a failure, where the first user equipment and the second user equipment are part of a same device, and where the first user equipment is configured with a first primary reliability group and where the second user equipment is configured with a second primary reliability group; means for, based upon the indication, the first user equipment transmitting to a network equipment a first signal to activate a secondary reliability group for the first user equipment; and means for receiving, by the first user equipment, a second signal to use the secondary reliability group, where the second signal is at least partially based upon the first signal transmitted from the first user equipment.

An example embodiment may be provided in an apparatus comprising means for detecting, by a first network equipment, that a first user equipment has experienced a failure, and where the first user equipment is configured to belong to a primary reliability group which comprises the first network equipment; and means for transmitting an indication, by the first network equipment, to a second network equipment regarding the failure detected by the first network equipment, where the indication includes information for the second network equipment to inform the second user equipment to start use of a secondary reliability group.

An example embodiment may be provided in an apparatus comprising means for receiving an indication, by a first network equipment, where the indication indicates that a second user equipment has experienced a failure; means for, based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. An apparatus comprising:
at least one processor; and
at least one non-transitory memory including computer program code, the at least one memory and the computer program code configured to, with the at least one processor, cause the apparatus to:
receive, by a first user equipment of the apparatus, an indication that a second user equipment of the apparatus has experienced a failure, where the first user equipment and the second user equipment are part of a same apparatus, and where the first user equipment is configured with a first primary reliability group and where the second user equipment is configured with a second primary reliability group;
based upon the indication, transmit to a network equipment a first signal to activate a secondary reliability group for the first user equipment; and
receive, by the first user equipment, a second signal to use the secondary reliability group, where the second signal is based upon the first signal transmitted from the first user equipment.

2. The apparatus of claim 1, wherein the apparatus comprises a housing which houses the first user equipment and the second user equipment.

3. The apparatus of claim 1, wherein the apparatus is a mobile device, and where the first user equipment and the second user equipment are connected to move together when the mobile device is moved.

4. The apparatus of claim 1, wherein the indication is an indication from a control entity of the apparatus.

5. The apparatus of claim 4, wherein the control entity comprises a control application configured to detect when the second user equipment has a failure, and cause the first user equipment to be reconfigured to activate use of the secondary reliability group.

6. The apparatus of claim 5, wherein the control application is configured to notify a monitoring application that the control application has detected the failure indicating that the second user equipment needs to be repaired or replaced.

7. The apparatus of claim 1, wherein the indication is based upon direct signaling between the first user equipment and the second user equipment.

8. The apparatus of claim 1, wherein the first signal comprises a one-bit indication to the network equipment to indicate dual connectivity activation.

9. The apparatus of claim 1, wherein the first signal comprises a request by the first user equipment for a packet data unit session modification procedure in order to support dual connectivity.

10. The apparatus of claim 1, wherein the apparatus is further configured to, based upon receipt of the second signal, the first user equipment switching from a single connectivity with a single base station to a multi-connectivity with at least two base stations.

11. The apparatus of claim 1, wherein the apparatus is further configured to detect repair or replacement of the second user equipment and subsequently transmit an indication to deactivate use of the secondary reliability group by the first user equipment.

12. The apparatus of claim 1, wherein the secondary reliability group is the second primary reliability group of the second user equipment.

13. An apparatus comprising:
at least one processor; and
at least one non-transitory memory including computer program code, the at least one memory and the computer program code configured to, with the at least one processor, cause the apparatus to:
detect, by a first network equipment of the apparatus, that a first user equipment has experienced a failure, and where the first user equipment is configured to belong to a primary reliability group which comprises the first network equipment; and
transmit an indication, by the first network equipment, to a second network equipment regarding the failure detected by the first network equipment, where the indication includes information for the second network equipment to inform the second user equipment to start use of a secondary reliability group,
wherein the information, transmitted by the first network equipment to the second network equipment, is configured to cause the second network equipment to activate dual connectivity for the second user equipment with at least the first network equipment and the second network equipment, where the first network equipment is configured as part of a secondary reliability group of the second user equipment.

14. The apparatus of claim 13, wherein the first user equipment and a second user equipment are part of a same device, and where the device comprises a housing which houses the first user equipment and the second user equipment.

15. The apparatus of claim 14, wherein the device is a mobile device, and where the first user equipment and the second user equipment are connected to move together when the device is moved.

16. The apparatus of claim 13, wherein the detecting is based upon at least one of:
the first network equipment detecting that the first user equipment has stopped transmitting user plan signaling;
the first network equipment detecting that the first user equipment has stopped transmitting control plan signaling; or
the first network equipment detecting a radio link failure towards to the first user equipment.

17. An apparatus comprising:
at least one processor; and
at least one non-transitory memory including computer program code, the at least one memory and the computer program code configured to, with the at least one processor, cause the apparatus to:
allow receiving of an indication, by a first network equipment, where the indication indicates that a second user equipment has experienced a failure;
based upon receipt of the indication, the first network equipment transmitting a signal to a first user equipment, where the first user equipment is configured a first reliability group comprising the first network equipment, where the first user equipment and the second user equipment are part of a same device, and where the signal comprises information which causes the first network equipment to activate dual connectivity for the first user equipment, where the first user equipment has the second network equipment configured as a secondary reliability group.

* * * * *